UNITED STATES PATENT OFFICE.

JOHN D. EMACK, OF BALDWIN, NEW YORK.

COMPOSITION FOR MAKING BLACKBOARDS, &c.

SPECIFICATION forming part of Letters Patent No. 356,825, dated February 1, 1887.

Application filed June 26, 1886. Serial No. 206,354. (Specimens.)

*To all whom it may concern:*

Be it known that I, JOHN D. EMACK, a citizen of the United States, residing at Baldwin, in the county of Queens and State of New York, have invented certain new and useful Improvements in Composition for Making Blackboards, &c.; and I do declare the following to be a full, clear, and exact description of the invention, such as will enable others skilled in the art to which it appertains to make and use the same.

This invention relates to an improved composition of matter for the construction of blackboards and analogous articles.

The invention consists in the composition hereinafter set forth and claimed.

To make the composition I use the following ingredients, in about the proportions stated: slate-dust, one hundred pounds; brimstone, twenty pounds; Frankford black, five pounds. These ingredients are placed in a dry state in a kettle, the kettle placed over a fire, the contents are stirred and the stirring continued, the kettle being kept over the fire until a temperature of 360° Fahrenheit is attained. The composition is then ready to be poured into molds suitable to the article to be formed.

In using the above ingredients roll-brimstone is preferred. The Frankford black is intended to give the color especially adapted for blackboards. Other colors may be used, according to the article to be made.

A composition thus made is especially adapted for blackboards; but at the same time it is equally applicable to other articles, such as ordinary school-slates, roofing-slate, tiles, slate-pencils, billiard and other table tops, moldings, plaques, and other analogous articles.

Having described my invention, what I claim is—

A composition for making blackboards and analogous articles, the same consisting of slate-dust, brimstone, and Frankford black, in about the proportions set forth.

In testimony whereof I affix my signature in presence of two witnesses.

JOHN D. EMACK.

Witnesses:
W. H. SINGLETON,
S. A. TERRY.